June 9, 1964    R. L. KOLLODGE    3,136,344
COUPLING DEVICE

Filed Nov. 19, 1962    2 Sheets-Sheet 1

INVENTOR
RICHARD L. KOLLODGE
BY
David A. Roden
ATTORNEY

June 9, 1964
R. L. KOLLODGE
3,136,344
COUPLING DEVICE
Filed Nov. 19, 1962
2 Sheets-Sheet 2
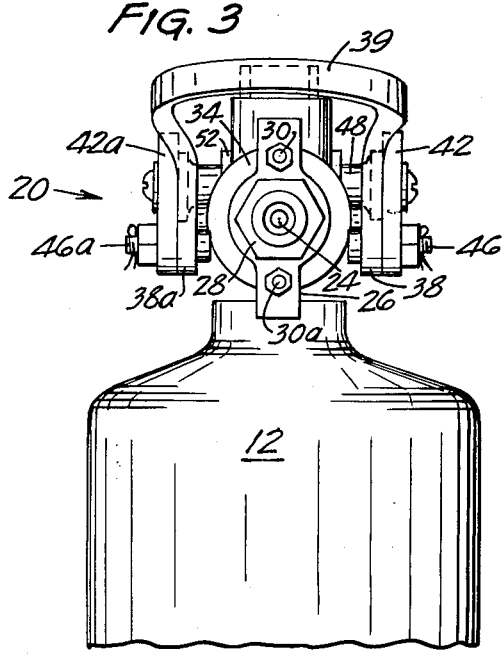
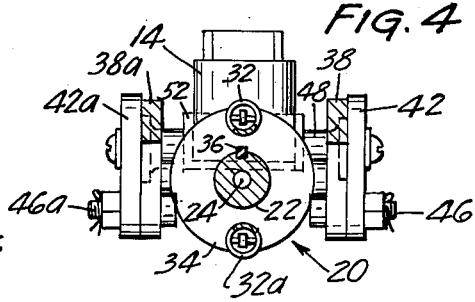
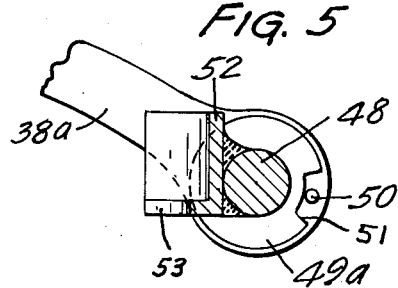
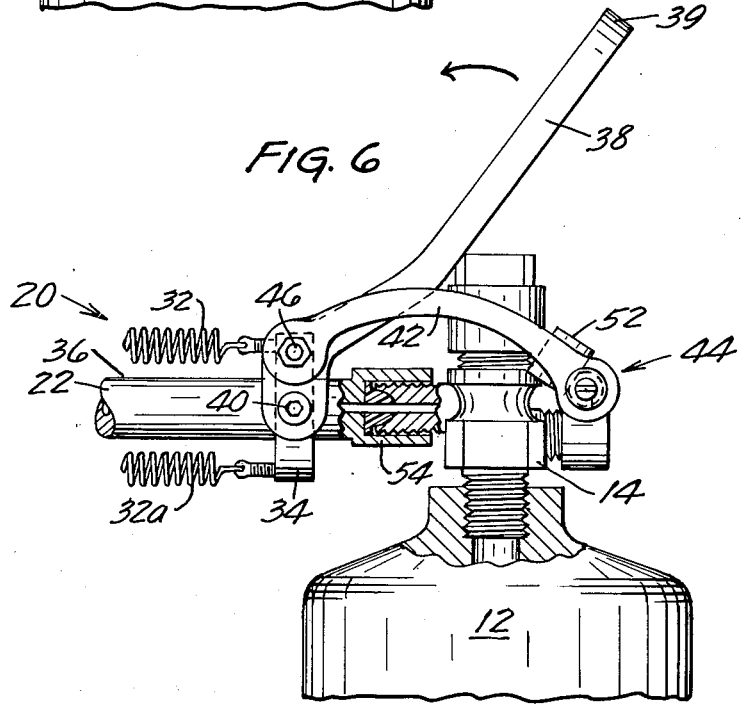
INVENTOR
RICHARD L. KOLLODGE
BY
David A. Roden
ATTORNEY

United States Patent Office 3,136,344
Patented June 9, 1964

3,136,344
COUPLING DEVICE
Richard L. Kollodge, 285 Garwood Ave.,
St. Paul Park, Minn.
Filed Nov. 19, 1962, Ser. No. 239,105
7 Claims. (Cl. 141—383)

This invention relates to a coupling device. The device has particular utility in filling of cylinders with gases such as oxygen, helium, carbon dioxide, acetylene and the like. This application is a continuation-in-part of my copending application Serial No. 49,341 filed August 12, 1960, now abandoned.

Many of such cylinders have a projecting externally threaded filling and discharge orifice. As far as I am aware the connection between the main supply line and such a cylinder filling orifice is normally accomplished by a connector having a female threaded nozzle surrounded by a wheel-like arrangement to aid in the screwing and unscrewing of the nozzle. Care must be exercised to mate the threads and assure a gas-tight connection. The operator frequently has to turn the cylinder slightly to provide a direct head-on alignment of the nozzle and the filling orifice to avoid cross-threading and damage to the threads. These and other difficulties cause time-consuming delays in the filling of such cylinders.

It is therefore an object of the present invention to provide a rapidly attachable and releasable coupling device for establishing a gas-tight connection between the gas source line and the cylinder that is to be filled.

It is a further object to provide a coupling device which may be essentially operated by one hand, leaving the operator's other hand free to turn or hold the cylinder when connecting or disconnecting the device, or free to operate other valves associated with the filling operation.

Another object is to provide a coupling device wherein an absolute head-on alignment between the filling orifice and the nozzle need not be established prior to making the connection.

A further object is to provide a coupling device which when used under undue or unexpected pressures, will not inadvertently totally disengage from a cylinder to which it is connected so as to be dangerous to life and limb of anyone in the immediate vicinity of the filling operation.

The attainment of these and other objects of the invention will be more readily understood by the following description and reference to the accompanying drawings wherein a form of my invention is described and illustrated.

Referring now to the drawings, FIGURE 1 is a side elevation (partially broken away) of the coupling device in operative position connecting a supply line to a cylinder.

FIGURE 3 is a rear elevation of the device only, connected to a cylinder.

FIGURE 4 is a cross section rear elevation along the line 4—4 of FIGURE 1.

FIGURE 5 is a side elevation of a section of a portion of the device along the lines 5—5 of FIGURE 2.

FIGURE 6 is a side elevation (partially broken away) showing the device immediately before the coupling is effected and further illustrating an alternate gasketing means.

Figure 1:
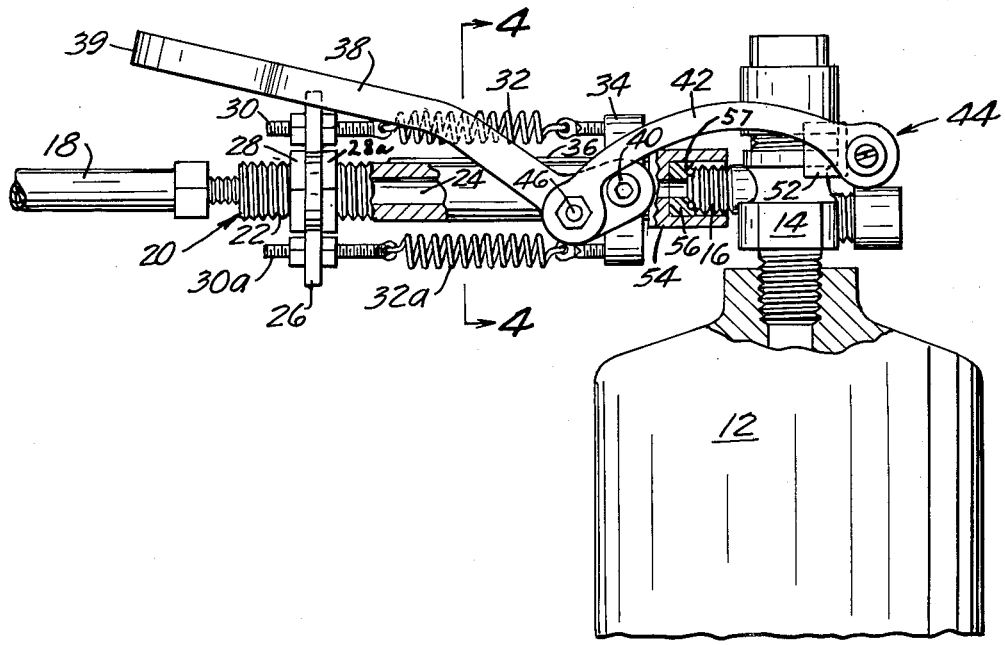

Referring now to the FIGURE 1, the cylinder 12 has valving member 14 which includes an externally threaded tubular filling and discharge fitting 16. A supply line 18 which is frequently of heavy gauge copper tubing serves as a conduit for gas from a supply source (not shown). The novel coupling device 20 is connected to the supply line 18 by any suitable means, such as by being screwed into the internally threaded first extremity on the end portion of the filler barrel 22 as illustrated, or by a tubing nut threaded externally over the end portion of the barrel. The filler barrel 22 has an internal bore 24 to provide communication from the supply line through to the fitting 16 of the valving member on the cylinder. An adjustable collar 26 is mounted on the filler barrel near the first extremity thereof. This collar may be moved along the longitudinal axis of the filler barrel and fixed at any desired position by the opposing lock nuts 28 and 28a. Eye bolts 30 and 30a are adjustably fixed in the collar 26 to provide anchorage for biasing means, here shown as springs 32 and 32a. The ends of the springs distal to the collar 26 are in turn connected to a sliding block 34 which is bored to receive the filler barrel 22 and positioned thereon so as to be slidable along the longitudinal axis thereof. The biasing means thus urge the collar 26 and block 34 toward each other.

Preferably the filler barrel is provided with a featherkey 36, and a corresponding keyway is provided in the block 34. This arrangement overcomes any tendency of the block and associated parts to rotate circumferentially about the barrel 22. Terminal portions of the somewhat L-shaped arms 38 and 38a of a U-shaped handle member 39 are pivotally connected to opposite sides of the block 34, as by coaxial shoulder screws 40 and 40a. The terminal portions of the arms 42 and 42a of a somewhat U-shaped clamping member 44 are pivotally connected to the handle arms 38 and 38a respectively, as by coaxial shoulder screws 46 and 46a which extend through said arms at a position near the shoulder screws 40 and 40a but intermediate the shoulder screws 40 and 40a and the closed end of the handle member to provide an over-center linkage as shown.

Figure 2:
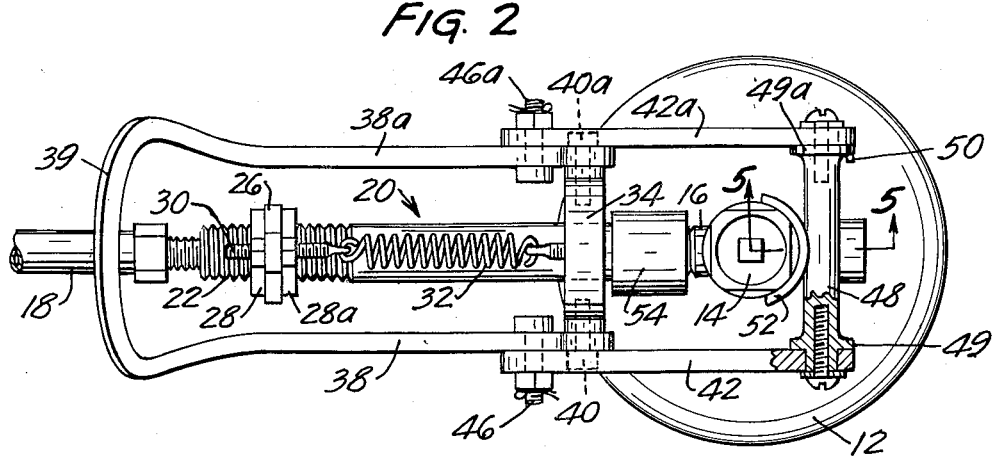
FIGURE 2 is a plan view of the connecting device and the cylinder shown in FIGURE 1.

The closed end of the clamping member 44 comprises a revolvable cross member 48 having flanged ends 49 and 49a and which is limited in its rotation by a stop pin 50 which is positioned within a notched portion 51 formed in at least one of said flanged ends as shown in FIGURES 2 and 5. Affixed to the cross member 48 is an arcuate collar member 52 having a lower edge flange 53 for engaging a portion of the valve member 14 on the side thereof opposite the fitting 16. The cooperating pin 50 and notch 51 in the flange 49 are so arranged that the concave face of the half collar is oriented toward the block 34, for instance, as the coupling device 20 is lowered into position over the valving member 14 of the cylinder. This limited rotatability of the closed end of the clamping member further permits the concave portion of the half collar 52 to come flush against the valve member as the coupling device is clamped shut.

The generally cup-shaped nozzle end 54 on the second extremity of the filler barrel 22 as illustrated in FIGURES 1 and 2 is adapted to fit over an externally threaded filling and discharge fitting. Some such fittings are internally threaded, and of different diameter, e.g. on acetylene tanks; therefore it is useful to provide a nozzle on the filler barrel which may be readily removed and interchanged to accommodate the particular type of tank to be filled in a given operation.

As shown in FIGURE 1, at the bottom of the mouth portion of the nozzle end is an annular gasket 56. The face of the gasket is grooved to accommodate and properly seat an "O-ring" 57. The O-ring may be made of neoprene rubber, and a suitable gasket material is a tetrafluoroethylene polymeric material commercially available from E. I. Du Pont & Co. under the trademark "Teflon."

An alternate shape for the gasket member 56 of the filler barrel is shown in FIGURE 6. This form of nozzle end is adapted for the filling of tanks which have a filling and discharge fitting 16 which is recessed or concave on its face rather than the essentially flat face found on the fitting of the valve member illustrated in FIGURE 1. The shape of the nozzle end and of the gasket member 56 may be readily adapted for any particular type or style of fittings. However, the cup-shaped nozzle as illustrated in the drawings is presently preferred because of its cooperative function in providing safety means to prevent my device from totally disengaging from a cylinder when in the closed coupled position. When constructing my device, the length of the clamping member arms 42 and 42a is selected so that when the device is in the closed coupled position on the valving member, as shown in FIGURES 1 and 2, the distance between the opposed portions of block 34 and the nozzle 54 is less than depth of the mouth portion of the nozzle, thereby limiting rearward movement of the filler barrel 22 so that the device cannot be accidently removed from the valving member while in the closed position—even if unexpected pressures are encountered which are sufficient to overcome the normally tight connection provided by the biasing means 32 and 32a or even upon complete functional failure of the biasing means. Thus as a specific illustration, for the commonly used valving member on commercial $CO_2$ tanks of about 50 lbs. capacity, my device is so constructed that in the closed position there is a distance of approximately $3/16$ to $1/4$ inch between the opposed portions of the block 34 and nozzle 54. The internal depth of the mouth of the open ended cup-shaped nozzle 54 is approximately $9/16$ inch so that even if the filler barrel is forced back while the device is in the closed coupled position and gas can leak out, the rearward travel of the filler barrel is so limited that the device is held on the valving member of the tank and cannot violently disengage therefrom.

For filling cylinders, the operator, for example, moves the cylinder 12 in front of the coupling device. With the coupling device in the "open" position as shown in FIGURE 6, the operator may with one hand still on the cylinder and the other hand grasping the handle member 39, merely lower the coupling device over the valve member 14 of the cylinder and slip the fitting 16 partially into the mouth of the nozzle member. With one hand the operator may now pull back on the handle member 39 in the direction of the arrow. This movement of the handle member progressively seats the concave face of the half collar portion 52 of the clamping member 44 against the side of the valve member 14 opposite the filling and discharge fitting and firmly seats the interior face of the nozzle against the face of the fitting. As the backward arcuate movement of the rearward portion of the handle member continues, the pivoted forwardmost portion of the handle arms 38 and 38a are traveling towards the valve member 14 carrying the associated sliding block 34 also towards the valve member. Forces are thus applied to the filler barrel 22 through the biasing means 32 and associated parts that securely seat the interior face of the filling nozzle 54 against the face of the fitting 16 to thus provide a gas-tight connection. The backward arcuate movement of the rearward portion of the handle member is limited by the shoulder screws 40 and 40a which ultimately serve as limiting lugs when they contact an interior surface of the clamping member arms 42 and 42a respectively as shown by the position in FIGURE 1. The connecting device is now locked in the "closed" position due to relative movement to on over-center position as shown in FIGURE 1 of the pivot points about the shoulder screws 46 and 46a rearward and inferior to the pivot points about the shoulder bolts 40 and 40a. After the cylinder is filled with the desired amount of gas the handle member is again moved forward to place the device in the open position as shown in FIGURE 6. A quick release valve (not shown) obviates the need for slowly moving the handle member to the open position, or alternately a small escape port may be provided in the sidewall of the nozzle end 54 intermediate the mouth thereof and the gasket member 56. The supply line 18 is normally about 2½ feet long and is sufficiently rigid to support the coupling device and yet flexible enough to allow raising and lowering of the coupling device over the valving member of the cylinder. Alternately, the supply line 18 may be maintained at the appropriate level by any suitable supporting means.

Appropriate changing of the position of the adjustable collar toward either extremity of the filler barrel 22 allows the connecting device to be readily adapted to valving members of various sizes or to adjust the firmness of the connection with a given size valve member, i.e. rearward movement of the collar 26 towards the first extremity of the filler barrel 22 causes a firmer connection on a valve member of a given size.

If desired, the inner surface of the mouth of the nozzle may be provided with a "Teflon" facing, or with any suitable material that is softer than the material (e.g. brass) used to form the filling orifice, and thereby diminish the opportunity for accidental damage to the external threads of a filling and discharge fitting.

It will of course be apparent that there are modifications and substitutions that could be made in the connecting device here described. However, it should be understood that such substitutions or modifications are within the spirit and scope of this invention, and the particular forms illustrated place no limitations thereon except as defined in the following claims.

I claim:
1. A rapidly attachable and releasable coupling device for establishing a gas-tight connection between a gas source and a fillable container having a valving member with a filling and discharge fitting thereon, said device comprising a filler barrel having at its first extremity means for connection with said gas source and at its other extremity nozzle means for connecting with said fitting, an adjustable collar fixed on said barrel, a sliding block mounted on said barrel between said collar and said nozzle means, biasing means connecting said block and said collar for urging said block and said collar toward each other, handle means pivotally connected to said block and clamping means pivotally connected to said handle means to form over-center linkages, the said linkages being so arranged that reciprocal arcuate movement of said handle means urges said clamping means towards and away from said nozzle means.

2. A rapidly attachable and releasable coupling device for establishing a gas-tight connection between a gas source and a fillable container having a valving member with a filling and discharge fitting thereon, said device comprising a filler barrel having at its first extremity means for connection with said gas source and at its other extremity means for connecting with said fitting; and, connected with said filler barrel, a collar on the first extremity of said barrel, a sliding block positioned on said barrel and longitudinally movable along the axis of said barrel, biasing means connecting said collar and said block and urging said collar and block toward each other, a handle member having arms pivotally connected at one end thereof with said sliding block, a clamping member having arms pivotally connected at the first end thereof with the arms of said handle member to form over-center linkages, and a cross member having an arcuate collar adapted to engage the side of said valve member opposite said fitting, said cross member joining the arms of said clamping member at the end furthermost from said first end thereof.

3. A rapidly attachable and releasable coupling device for establishing a gas-tight connection between a gas source and a fillable container having a valving member with a filling and discharge fitting thereon, said device comprising a filler barrel having at its first extremity means for connection with said gas source and at its other extremity means for connecting with said fitting, said filler barrel having along its longitudinal axis a featherkey and connected with said filler barrel; an adjustable collar on the first extremity of said barrel, a sliding block positioned on said barrel and longitudinally movable along the axis of said barrel and having a keyway to receive said featherkey, biasing means connecting said collar and said block for urging said block and said collar toward each other, a handle member having arms pivotally connected at one end thereof with said sliding block, a clamping member having arms pivotally connected at the first end thereof with the arms of said handle member to form over-center linkages, and a cross member having an arcuate collar adapted to engage the side of said valve member opposite said fitting, said cross member joining the arms of said clamping member at the end furthermost from said first end thereof.

4. A device according to claim 3 in which said cross member has at least one notched flanged end and at least one of said clamping member arms has a stop pin affixed thereto, said notched end and said pin being so positioned that said arcuate collar on said member is oriented towards said nozzle end of said filler barrel.

5. A rapidly attachable and releasable coupling device for establishing a gas-tight connection between a gas source and a fillable container having a valving member with a filling and discharge fitting thereon, said device comprising a filler barrel having at its first extremity means for connection with said gas source and at its other extremity means for connecting with said fitting; and, connected with said filler barrel, a collar on the first extremity of said barrel, a sliding block positioned on said barrel and longitudinally movable along the axis of said barrel, biasing means connecting said collar and said block for urging said collar and said block toward each other, a handle member having arms pivotally connected at one end thereof with said sliding block, a clamping member having arms pivotally connected at the first end thereof with the arms of said handle member to form over-center linkages, a cross member having an arcuate collar adapted to engage the side of said valve member opposite said fitting, said cross member joining the arms of said clamping member at the ends furthermost from said first end thereof and having at least one notched flanged end, at least one of said clamping member arms having a stop pin affixed thereto, said notched end and said pin being so positioned that said arcuate collar on said cross member is oriented towards said nozzle end of said filler barrel, said arcuate collar having a lower edge flange adapted to engage a portion of said fitting.

6. A device for establishing a gas-tight connection when in closed coupled position between a gas source and a valving member with a projecting filling and discharge fitting thereon, said device comprising a filler barrel having at its first extremity means for connection with said gas source and at its other extremity an open ended cup-shaped nozzle having a mouth adapted to slide over said fitting, a collar fixed on said barrel, a sliding block mounted on said barrel between said collar and said nozzle, biasing means connecting said collar and said block for urging said collar and said block toward each other, handle means pivotally connected to said block and clamping means pivotally connected to said handle means to form over-center linkages, the said linkages being so arranged that arcuate movement of said handle means toward said closed coupled position urges said clamping means toward said nozzle means, the depth of the mouth of said cup-shaped nozzle being greater than the distance between opposed portions of said nozzle and said block when said device is in said closed coupled position on said valving member.

7. A device according to claim 6 in which said handle means comprises a member having arms pivotally connected at one end thereof with said block, and said clamping member comprises a member having arms pivotally connected at the first end thereof with the arms of said handle member to form over-center linkages, a cross member having an arcuate collar adapted to engage the side of said valve member opposite said fitting, said cross member joining the arms of said clamping member at the ends furthermost from said first end thereof and having at least one notched flanged end, at least one of said clamping member arms having a stop pin affixed thereto, said notched end and said pin being so positioned that said arcuate collar on said cross member is oriented towards said nozzle end of said filler barrel.

References Cited in the file of this patent
UNITED STATES PATENTS

| | | |
|---|---|---|
| 1,122,844 | Andrews | Dec. 29, 1914 |
| 1,832,639 | Keeland | Nov. 17, 1931 |
| 1,936,868 | Whitney | Nov. 28, 1933 |
| 2,146,948 | Feykert et al. | Feb. 14, 1939 |